US008028849B2

(12) United States Patent  
Hall

(10) Patent No.: US 8,028,849 B2
(45) Date of Patent: Oct. 4, 2011

(54) REUSABLE CONTAINER

(75) Inventor: Russell G. Hall, Sylvania, OH (US)

(73) Assignee: Packaging Engineering LLC, Toledo, OH (US)

(*) Notice: Subject to any disclaimer, the term of this patent is extended or adjusted under 35 U.S.C. 154(b) by 634 days.

(21) Appl. No.: 12/152,154

(22) Filed: May 13, 2008

(65) Prior Publication Data

US 2008/0283583 A1 Nov. 20, 2008

Related U.S. Application Data

(60) Provisional application No. 60/917,772, filed on May 14, 2007.

(51) Int. Cl.
*B65D 8/14* (2006.01)
*B65D 45/16* (2006.01)

(52) U.S. Cl. ...................................... 220/4.33; 220/324

(58) Field of Classification Search ............... 217/5, 13, 217/12 R, 45, 17, 60 R, 57, 56; 229/124, 229/100, 198.3, 198.2; 220/682, 691, 677, 220/615, 616, 617; 446/122, 121, 120; *B65D 8/14, B65D 45/16*
See application file for complete search history.

(56) References Cited

U.S. PATENT DOCUMENTS

| 820,301 | A | * | 5/1906 | Hale | 229/104 |
| 963,313 | A | * | 7/1910 | Nack | 229/103.3 |
| 970,858 | A | * | 9/1910 | Smith | 220/4.28 |
| 1,403,233 | A | * | 1/1922 | Collins | 217/69 |
| 2,731,761 | A | * | 1/1956 | Marshall | 43/100 |
| 3,497,924 | A | * | 3/1970 | Lock | 229/198.2 |
| 3,572,535 | A | * | 3/1971 | Kinzie | 220/4.33 |
| 3,847,299 | A | * | 11/1974 | Page | 220/4.28 |
| 4,111,328 | A | * | 9/1978 | Eggert et al. | 220/4.01 |
| 4,561,554 | A | * | 12/1985 | Swincicki | 220/4.28 |
| 4,704,313 | A | * | 11/1987 | Maier | 428/33 |
| 4,809,851 | A | * | 3/1989 | Oestreich et al. | 206/599 |
| 5,174,448 | A | | 12/1992 | Flaig | |
| 2006/0186118 | A1 | | 8/2006 | Stojak et al. | |
| 2007/0102314 | A1 | * | 5/2007 | Dedmon | 206/386 |

* cited by examiner

*Primary Examiner* — Mickey Yu
*Assistant Examiner* — Robert J Hicks
(74) *Attorney, Agent, or Firm* — Marshall & Melhorn, LLC

(57) ABSTRACT

A reusable container comprises a base provided with a plurality of cut-outs, a lid provided with a plurality of cut-outs, and at least one wall panel comprising a plurality of tabs formed as unitary extensions of the wall panel, wherein the plurality of tabs engage the plurality of cuts-outs, securing the at least one wall panel to the base and to the lid. A back wall, a front wall brace, and at least one side wall brace provide support for the product. A method for electro-mechanically loading the container is also provided.

25 Claims, 18 Drawing Sheets

REUSABLE CONTAINER

RELATED APPLICATION

This application is claiming the benefit, under 35 U.S.C. 119(e), of the provisional application filed May 14, 2007 under 35 U.S.C. 111(b), which was granted Ser. No. 60/917,772. This provisional application is hereby incorporated by reference in its entirety.

FIELD OF THE INVENTION

This invention relates to improvements in packaging and shipping containers, and more particularly to improved returnable and reusable containers.

BACKGROUND OF THE INVENTION

Containers can be made of a wide variety of materials, depending upon the design requirements of the container. For example, containers made only of wood are relatively durable and are capable of carrying relatively heavy loads. However, the cost of the wood material and the labor for initial assembly may be quite high. Multiple reuses of wood containers are possible, but such known containers are not easily collapsible for return transport. Thus, relatively large amounts of space are required for return transport of such containers.

It is known to manufacture containers of corrugated material, e.g., corrugated cardboard or a combination of corrugated materials and wood. For example, U.S. Pat. No. 5,174,448 discloses a wood pallet with recyclable cardboard side walls. Such containers are limited in strength and in carrying capacity. Further, where re-use of containers is desired, as is the case with returnable packaging, known containers will withstand only limited re-use. Also, while some known containers may be collapsed to allow for compact return transportation, much work is needed to reconstruct the container for re-use.

U.S. Published Patent Application No. 20060186118 describes a reusable container for transporting a product comprising a base, a lid, at least one wall having vertical ends operatively connecting the base to the lid, the at least one wall mounted generally perpendicular to the base and to the lid in a first plane, the wall having at least one unitary exterior rib offset from the first plane, and at least one unitary corner flange formed at about a right angle to the first plane at one of the vertical ends.

It would be desirable to provide a reusable container for transporting heavy, yet fragile materials which is structurally robust yet relatively low in cost, and easy to assemble and disassemble.

SUMMARY OF THE INVENTION

The present invention relates to a reusable container suitable for transporting heavy but fragile materials/products, for example glass sheets/panels. The container is comprised of a number of components which can be quickly and easily assembled and disassembled with minimal use of tools and only easily insertable/removable clip-type fasteners to supplement the means provided by the design of the container itself to firmly secure the various components into a robust container. In a preferred configuration, no additional banding or plastic wrapping is necessary to enhance the integrity of the attachment system of the container.

In an especially preferred embodiment the subject reusable container comprises a base member having a major horizontal surface which contains cut-outs of varying geometric shape to serve a variety of purposes, including at least one T-shaped cut-out, wall panels characterized by vertical support members, one or more locking tabs formed in the top and the bottom peripheral edges of each such wall panel which locking tabs are inserted into, for example, such T-shaped cut-outs, and clip slots formed in the major exterior surface of each of the wall panels, a lid panel preferably, having a plurality of cut-outs in the major horizontal surface thereof, optionally, front and back wall braces which help support and protect the products being transported. Metal spring clips inserted into clip slots on adjacent panels assist in maintaining the various panels in interlocking contact.

The utilization of the tabs and cut-outs of the various components, as previously described, when interconnected, forms a rigid structure. This is true even if the container is only partially assembled, for example, when back and side wall panels are attached to the base via the tabs and cut-outs, and back and side wall braces are also attached to the base via the tabs and cut-outs, adjacent the back and side wall assemblies, respectively. Such partial assembly then allows the container to be loaded by an electromechanical device, such as a robot. After loading is complete, the desired snug fit of the side wall braces can be optimized by insertion of one or more removable filler assemblies between the side wall brace and the adjacent side wall panel.

Assembly of the container by attaching the front wall panel and front wall brace via the tabs and cut-outs and placement of the lid panel such that the tabs on the upper peripheral edges of the wall panels align with cut-outs in the lid panel provides initial interlocking of those components. Most preferably, first ends of metal spring clips are inserted into clip slots in each of the wall panels and are expanded so as to allow the opposite ends of the spring clips to engage with suitable cut-outs in the periphery of the base and in the major surface of the lid panel. Once expanding pressure is terminated, the spring clips contract to exert a locking force to even more securely attach the base, walls and lid panel to one another.

While any suitable materials may be utilized in accordance with the invention, vertical supports are preferably wood, while the major surface of the base, the wall panels and the lid panel are preferably oriented strand board (OSB). The front wall, back wall and side wall braces are preferably a combination of wood and OSB. The removable filler assemblies are preferably a polymeric foam encased by a corrugated material.

From the foregoing disclosure and the following more detailed description of various preferred embodiments it will be apparent to those skilled in the art that the present invention provides a significant advance in the technology of returnable containers. Particularly significant in this regard is the potential the invention affords for providing a high quality, low cost returnable container. Additional features and advantages of various preferred embodiments will be better understood in view of the detailed description provided below.

Figure 1:
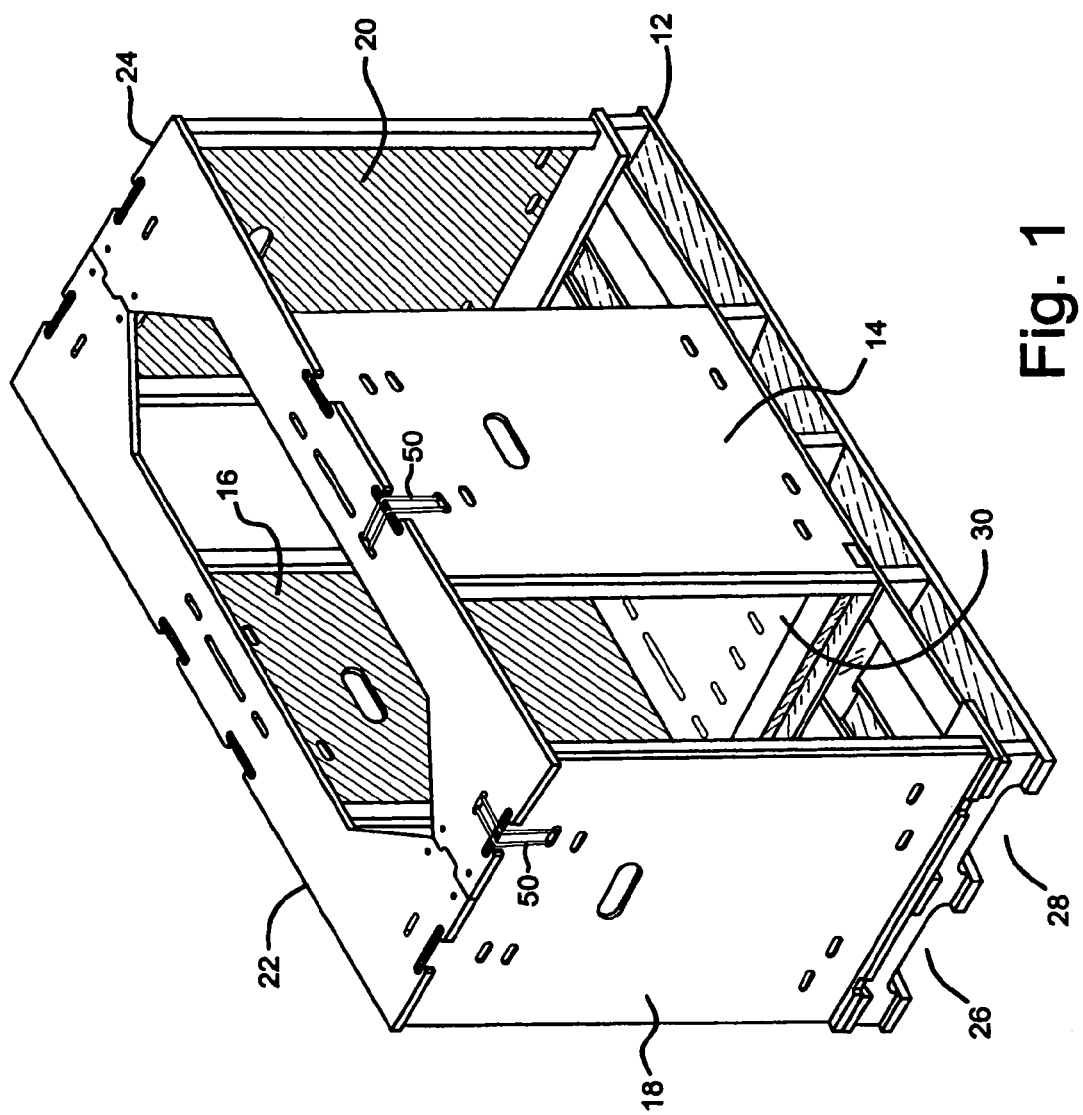
FIG. 1 is a perspective view of an improved container suitable for re-use in accordance with a first embodiment of the invention.

It should be understood that the appended drawings are not necessarily to scale, presenting a somewhat simplified representation of various preferred features illustrative of the basic principles of the invention. The specific design features of the returnable container as disclosed here will be determined in part by the particular intended application and use environment. Certain features of the illustrated embodiments have been enlarged or distorted relative to others to enhance visualization and clear understanding. In particular, thin features may be thickened, for example, for clarity of illustration. All references to direction and position, unless otherwise indicated, refer to the orientation illustrated in the drawings.

DETAILED DESCRIPTION OF THE PREFERRED EMBODIMENTS

It will be apparent to those skilled in the art, that is, to those who have knowledge or experience in this area of technology, that many uses and design variations are possible for the reusable container disclosed here. The following detailed discussion of various alternative and preferred features and embodiments will illustrate the general principles of the invention with reference to a reusable container particularly suitable for use with window fixtures, such as windshields, rear windows and other glass sheets. Other embodiments suitable for other applications will be apparent to those skilled in the art given the benefit of this disclosure.

Figure 2:
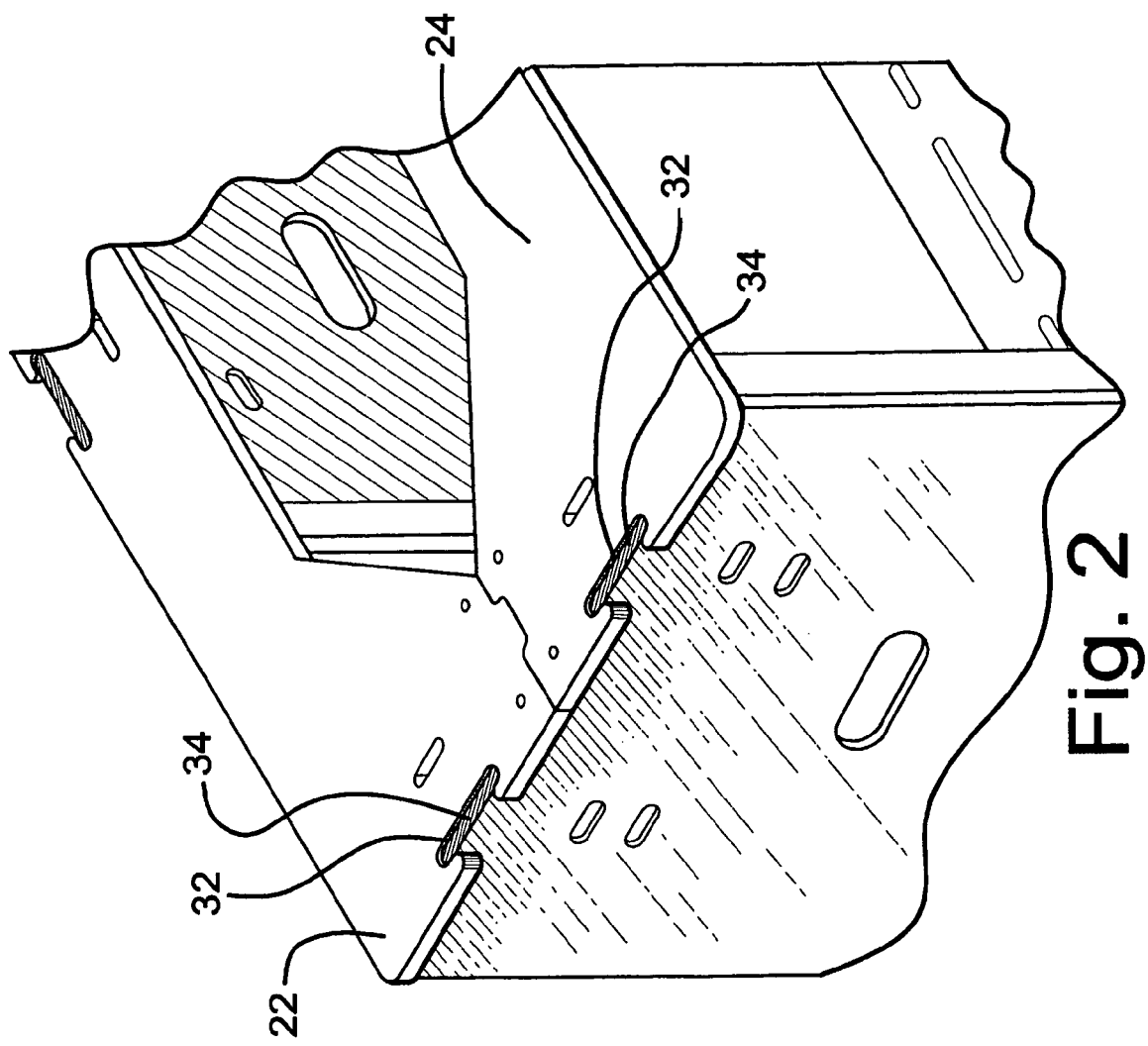
FIG. 2 is a perspective view showing how the end pieces connect to the lip pieces via a tab and slot arrangement in accordance with the invention.
Figure 4:
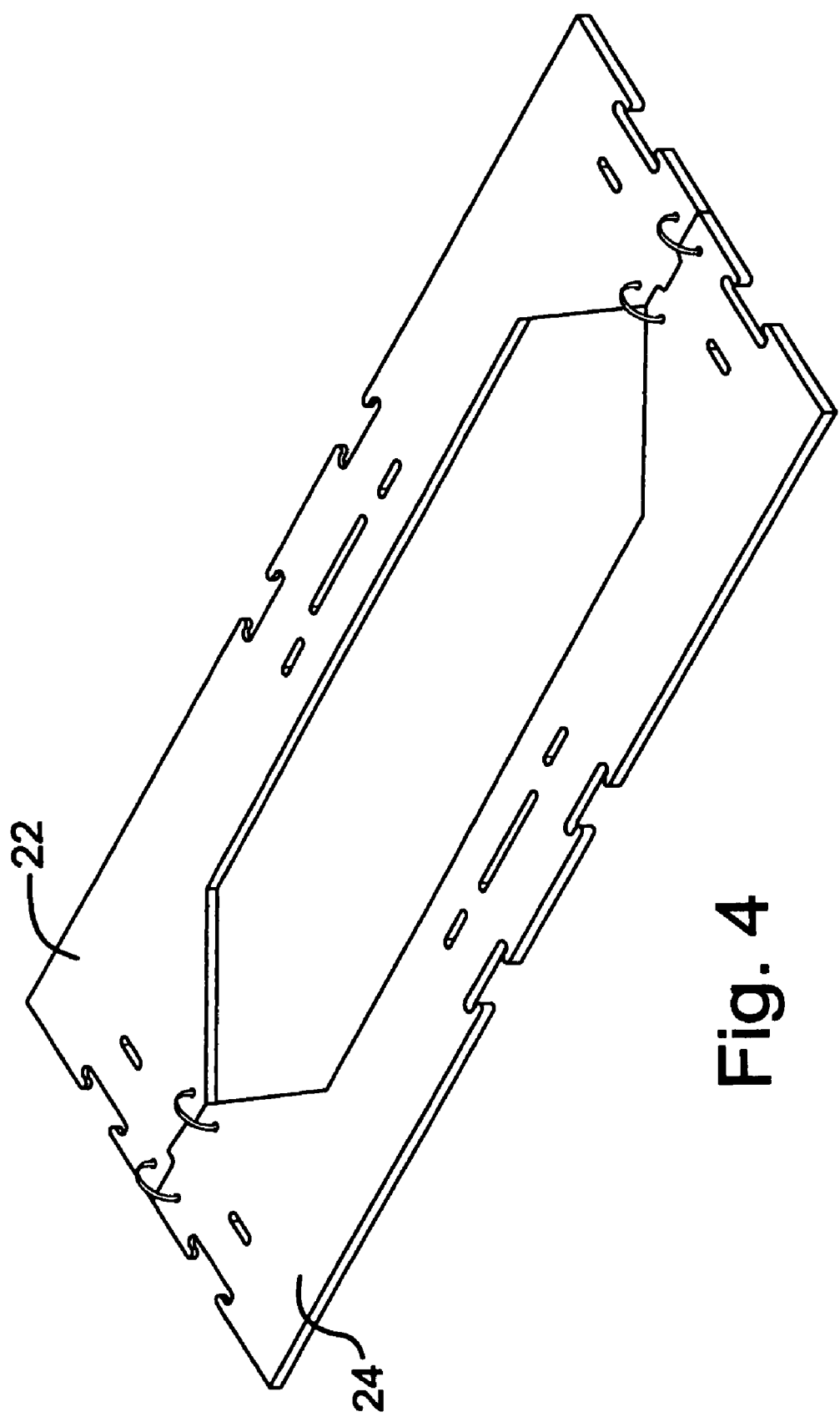
FIG. 4 is an isolated perspective view of the lid walls and tie straps in accordance with the invention.

Certain advantageous features of a first embodiment of the invention are shown, for example in FIGS. 2 and 4, wherein each of the lid panels 22, 24 have a T-notch or a T-cut-out 32 formed therein that is sized to receive a tab 34 from one of the side walls 14, 16, or end walls 18, 20, fitting to the lid panels 22, 24, like a puzzle piece. This helps to stabilize and "tighten" the crate. The side walls 14, 16, and end walls 18, 20, may optionally have ribbing, as desired.

Figure 3:
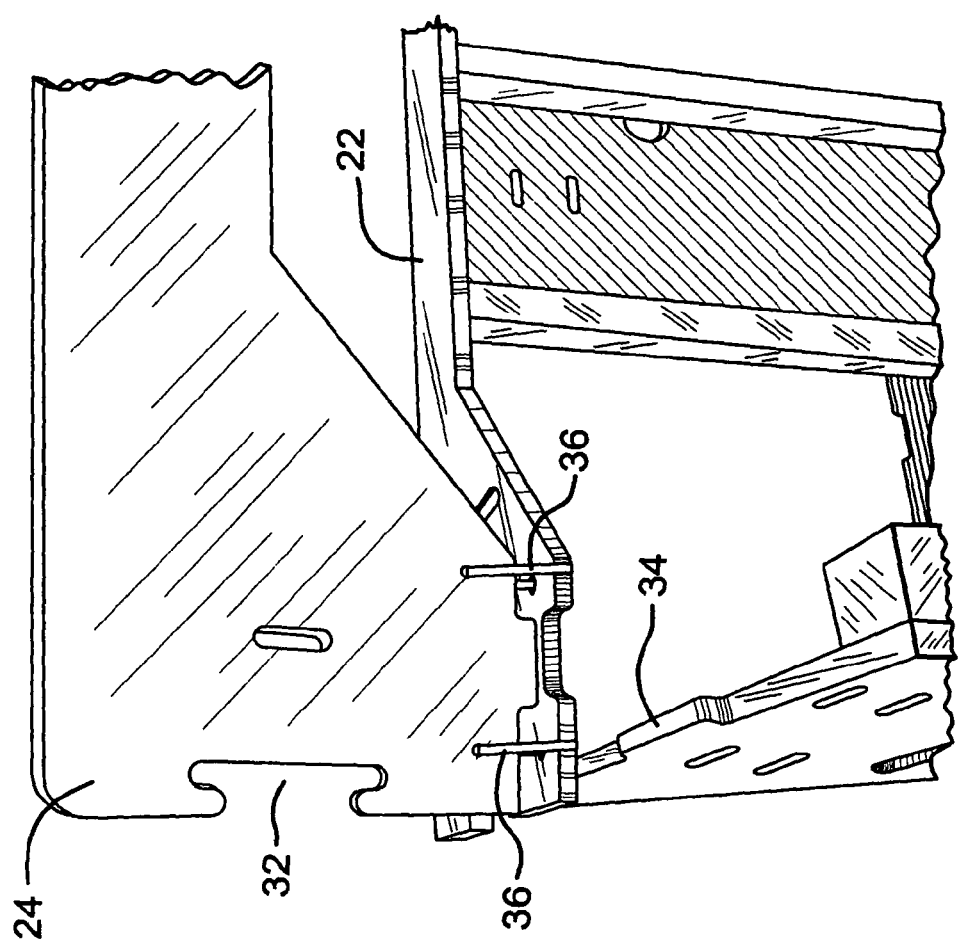
FIG. 3 is a perspective view of one of the lid panels pivoted and connected to the other lid wall by a series of tie straps in accordance with the invention.

As shown, for example in FIG. 3, the two lid panels 22, 24 are connected by 2 of more tie-straps 36. The tie-straps 36 allow a front lid panel 24 to hinge over a back lid panel 22 when an operator is loading or unloading the container 10.

Two of more bottom supports 42 have at least one male locating device 44 affixed to or formed on each bottom support base 43 of each bottom support 42, which locating device 44 fits into pre-cut cut-outs 46 in the major horizontal surface 48 of the base 12. The at least one male locating device 44 placed into the complementary cut-out(s) 46 in base 12 help to keep the bottom supports 42 from shifting while loading the glass and help to distribute the weight of the glass while the container 10 is in transit (see FIGS. 7-9).

Figure 8:
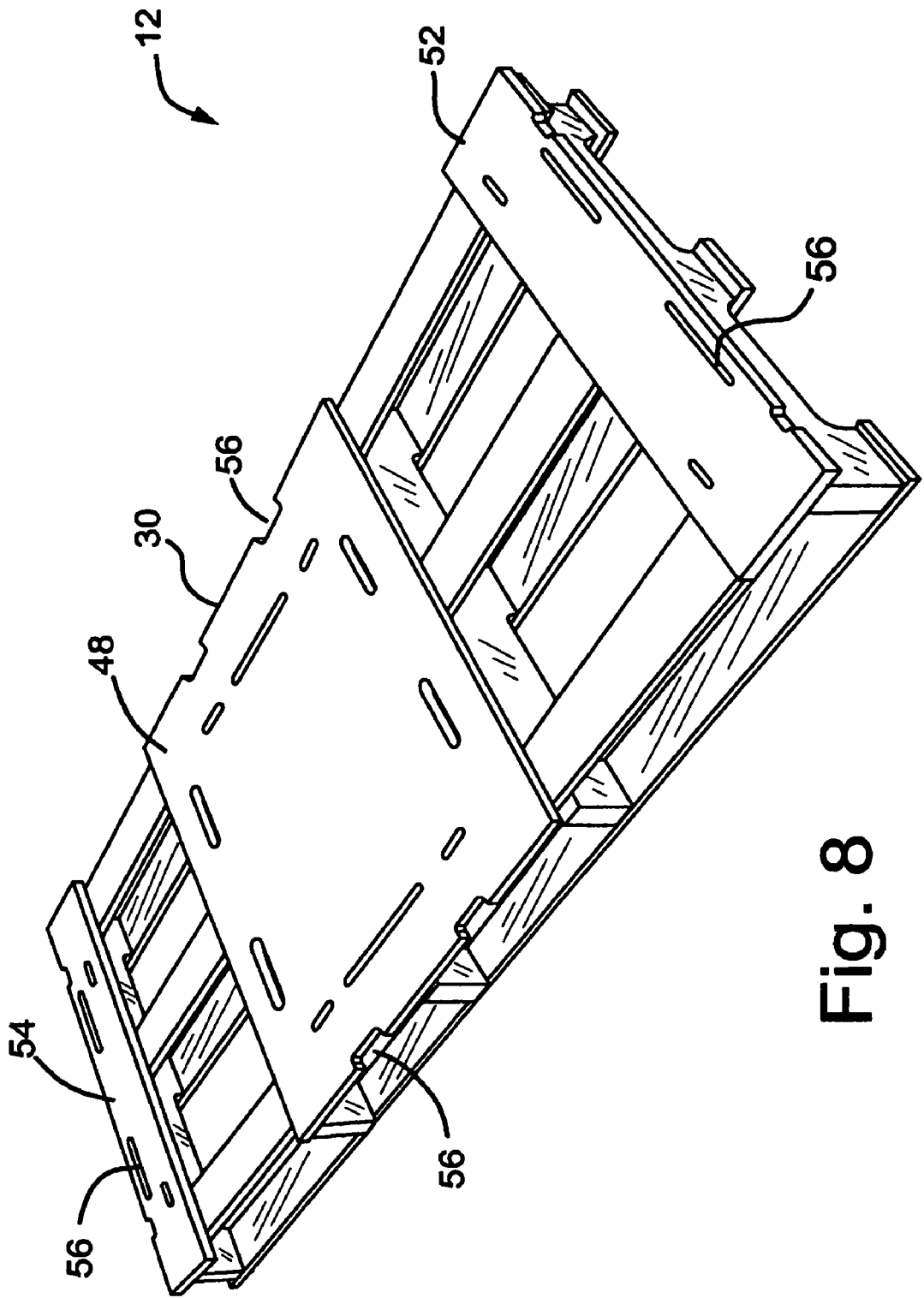
FIG. 8 is a perspective view of a base and a back brace carrier, with the back brace carrier formed from a material such as oriented strand board ("OSB") in accordance with the first embodiment.
Figure 10:
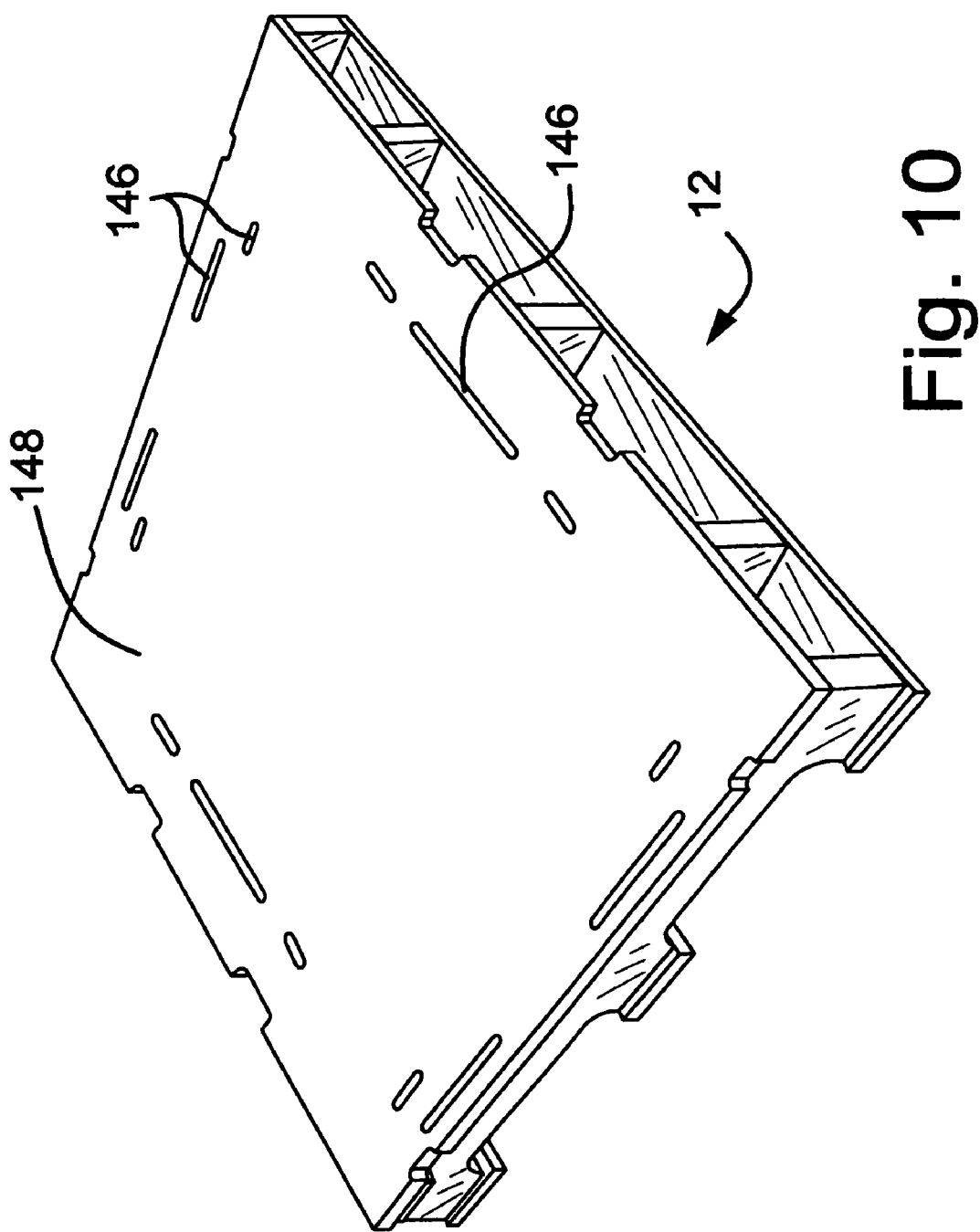
FIG. 10 is a perspective view of a base in accordance with a second embodiment of the invention.

The base member 12 of both the first and second embodiments, as shown in FIGS. 8 and 10 comprise a plurality of elongate beams, preferably comprising wood. The elongate beams are preferably connected by an appropriate number of cross beams, consistent with known base pallet design/construction practices. Variations in the major horizontal surfaces 48, 148 of the base member 12 of the first and second embodiments are illustrated in FIGS. 8 and 10, respectively.

Figure 6:
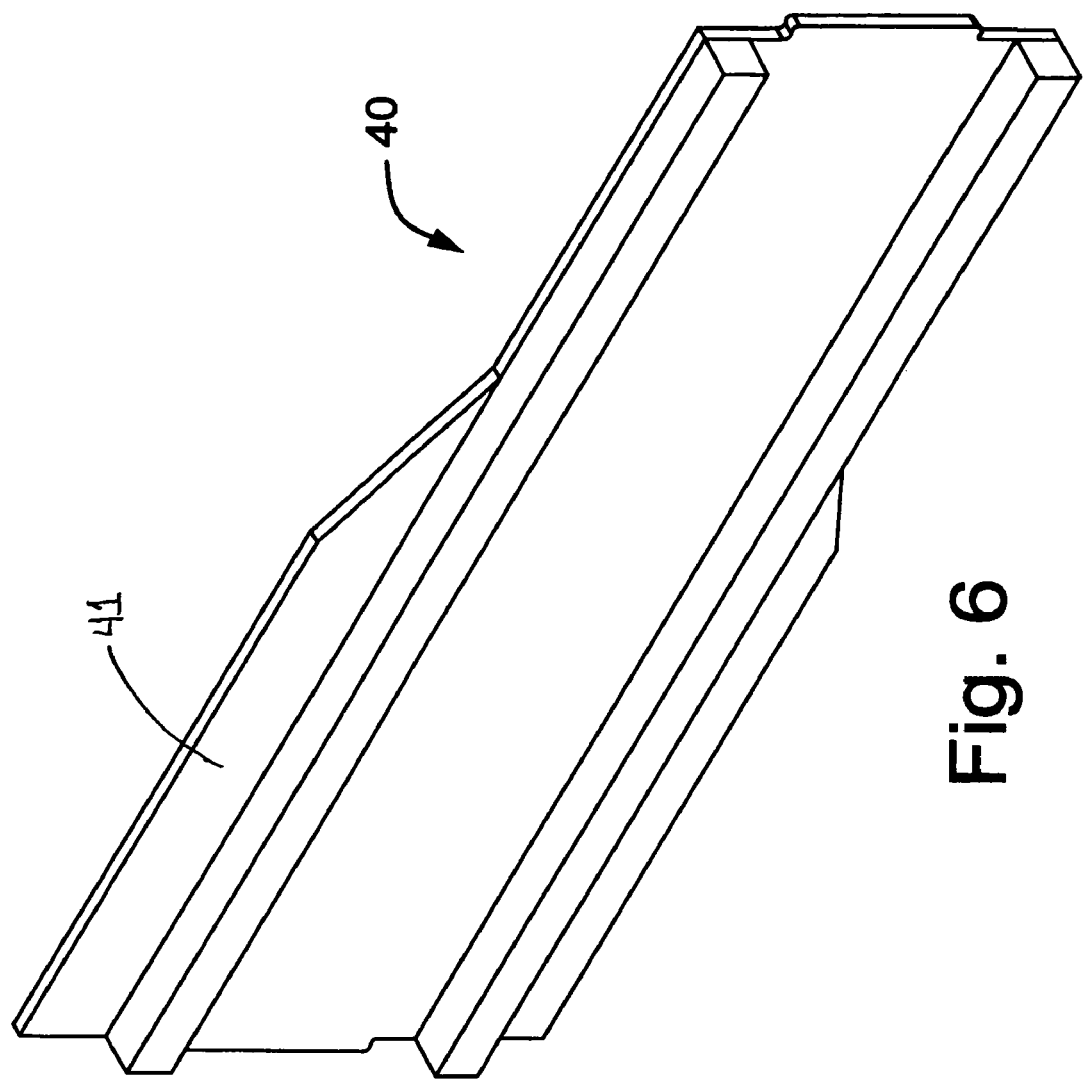
FIG. 6 is an isolated perspective view of a back brace in accordance with the first embodiment.

A perspective, assembled view of the first embodiment of reusable container or crate 10 suitable for carrying a product such as glass sheets or automotive glass products is shown in FIG. 1. The container 10 has a base 12, side walls 14, 16, end walls 18, 20 mounted generally perpendicular to the base 12, and a lid comprising lid panels 22, 24 mounted generally perpendicular to the side walls and end walls. In the first embodiment, a back brace 40 (see FIG. 6) supports the product and extends between the lid panels 22, 24 and the base 12 directly. The configuration of the back brace shown in FIG. 6 having lateral extensions 41 is particularly effective at distributing the weight of the product being transported in the container of the first embodiment.

Figure 17:
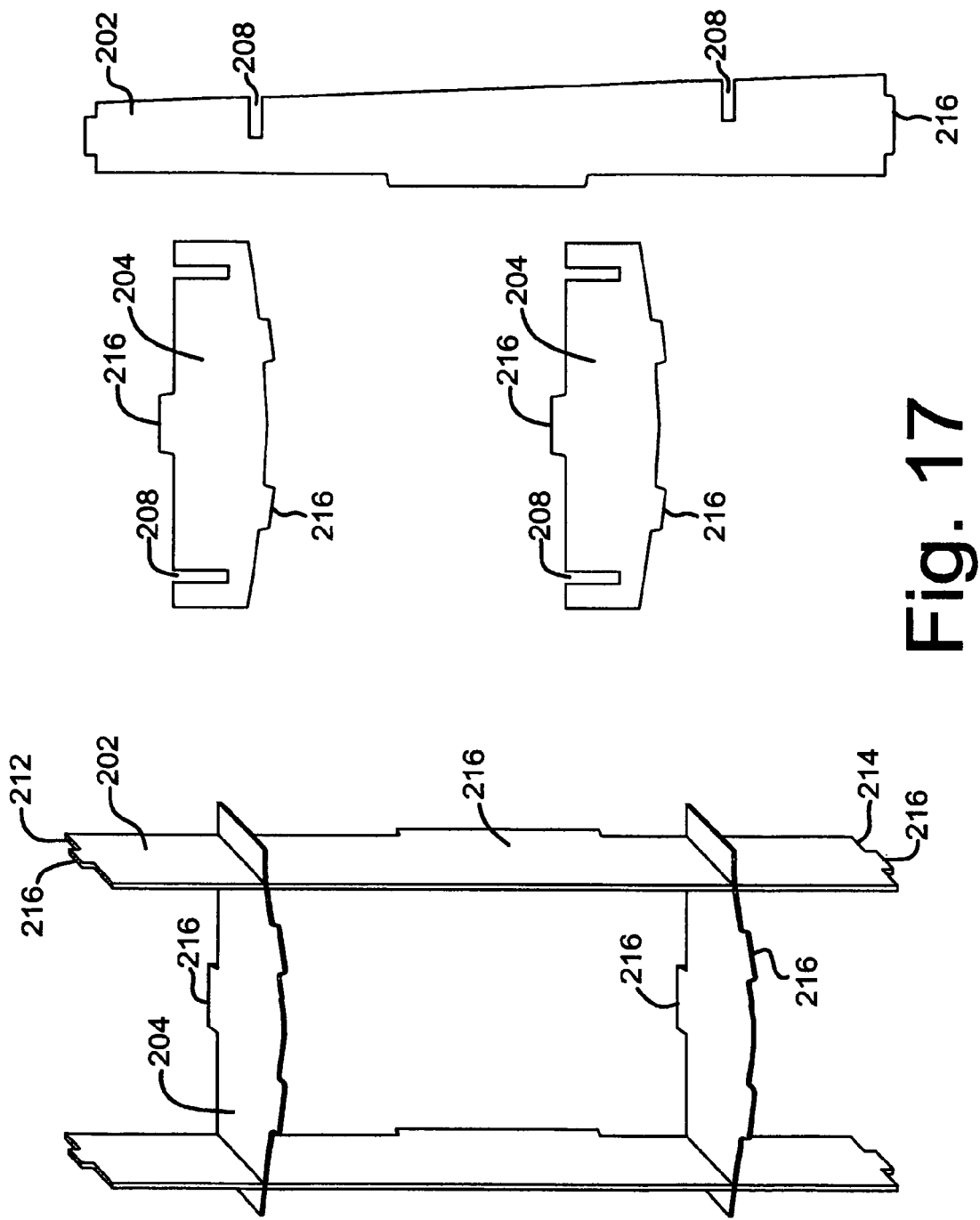
FIG. 17 is a perspective view of an alternative back brace assembly in accordance with the first embodiment of the invention.

An alternative back brace is shown in FIG. 17. The alternative back brace includes at least two vertical support members 202, and at least two horizontal support members 204. Vertical support members 202 and horizontal support members 204 are joined by slots 208, 210. Vertical support members 202 have top and bottom peripheral edges 212, 214 and tabs 216 integrally extending from top and bottom peripheral edges 212, 214 to enable interlocking with lid panels 22, 24, side wall 14, 16 and base 12, respectively. Horizontal support members 204, similarly, have front and rear peripheral edges from which tabs 216 integrally extend. Tabs 216 enable interlocking of horizontal support members with, for example, side wall 16 (see e.g., FIG. 1).

Alternatively, the back brace 40 may be mounted on a back brace carrier (not shown) attached to the base center section 30. Optionally, banding material may be utilized to assist in holding the product in place during transport.

Clips 50 may secure the base 12 to each of the side walls 14, 16 and end walls 18, 20, and secure the lid panels 22, 24, to the side walls 14, 16 and end walls 18, 20. The base 12 is preferably provided with side channels 26, 28 for receiving a forklift.

Preferably, the major horizontal surface of the base 48, 148, walls 14, 16, 18, 20, 114, 116, 118, 120, back brace 40, and lid panels 22, 24, all comprise a wood composite material formed by a molding process. More preferably, the wood composite material is OSB. "Wood composite" material and/ or products, as the term is used herein, may be described as being made from wood materials, primarily in the form of particles, flakes and/or fibers, combined with a resin, typically a thermoset resin, and bonded at an elevated temperature and elevated pressure, typically in a heated pressing device. Wood composite products advantageously use waste products from other processes, thus creating an environmental benefit. Wood composite materials are also resistant to insect infestation. Recent concern with international shipment of goods in containers made of materials which may harbor insects makes use of materials such as wood composite material particularly desirable. The wood used in some known current packaging must be heat treated and is not accepted by some countries. Wood composite materials may be as strong, or stronger than, wood, are in most cases cost competitive with wood, and may also be more dimensionally stable and moisture resistant than wood. The wood composite crate shown should have four to five times the life of known conventional corrugated board crate designs used for returnable packaging.

Figure 5A:
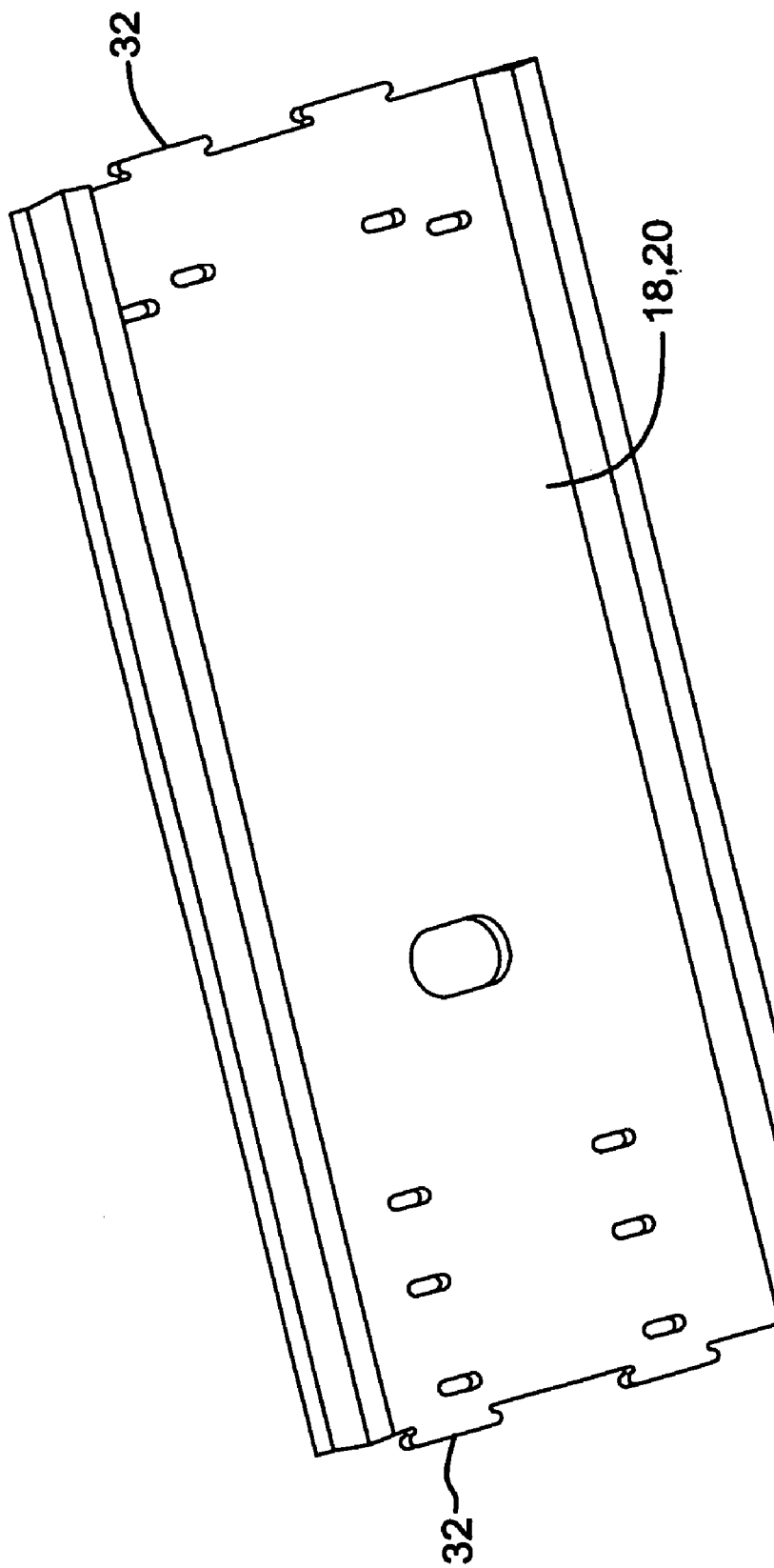
FIG. 5a is an isolated perspective view of an end wall in accordance with the first embodiment of the invention.
Figure 5B:
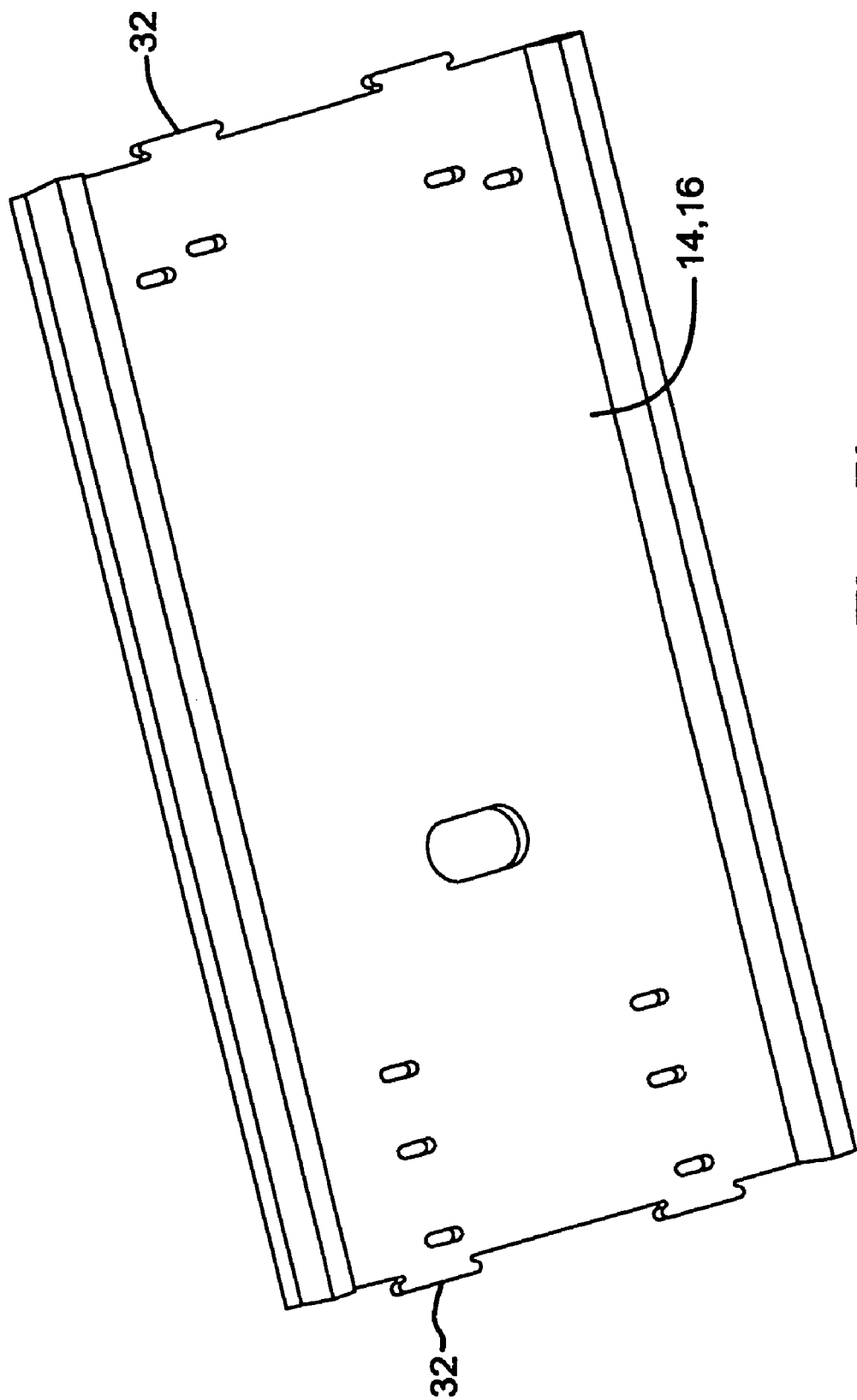
FIG. 5b is an isolated perspective view of a side wall in accordance with the first embodiment of the invention.

FIG. 5*a* shows an end wall 18, 20, and FIG. 5*b* shows a side wall 14, 16 particularly suitable for a container of the first embodiment of the present invention. Preferably, the walls 14, 16, 18, 20 are each mounted in a plane generally perpendicular to the base 12 and to the lid walls 22, 24. Optionally, the end walls 18, 20 and side walls 14, 16 may be essentially identical. This helps simplify assembly and disassembly of the container 10 and reduces the possibility of improper assembly. The walls each have tabs 34 which are adapted to fit into cut-outs 56 formed on the base 12 (at end pieces 52, 54 and center section 30) and on the lid panels 22, 24 (shown in FIGS. 2 and 8). Unitary tabs 34, preferably formed as a one-piece extension of the walls 14, 16, 18, 20 hold the walls 14, 16, 18, 20 together with the lid 22, 24 and base 12, allowing for clips 50 to be installed.

In both the first and second embodiments, the walls 14, 16, 18, 20, 114, 116, 118, 120, are generally planar, with each wall 14, 16, 18, 20, 114, 116, 118, 120, having a width and length.

FIG. 4 shows the lid panels 22, 24. Preferably the lid panels 22, 24 are essentially identical, as with the side walls 14, 16, 114, 116 and end walls 18, 20, 118, 120, again helping to make assembly and disassembly easier. While not essential, providing lid panels 22, 24 having the same dimensions avoids the problems of maintaining adequate supplies of different size panels at locations where the containers are assembled or may be re-assembled. Initial manufacturing costs may also be reduced.

In accordance with a highly advantageous feature of the invention, the reusable containers may be stacked together. As discussed above, the walls are sufficiently structurally robust to allow for stacking.

Advantageously, returnable and reusable containers or crates 10 disclosed herein "knock-down" into a relatively flat, compact shape, allowing for more crates to be placed on, for example, a truck or railroad car, enhancing the ease of return and storage. This feature of the crate 10 also significantly increases the number of crates that can be returned in a truck trailer, by as much as a 9 to 1 ratio over current returnable container packaging.

In a second embodiment of the reusable container according to the invention, a base member 12, as shown in FIG. 10, has a substantially continuous major horizontal surface 148, in which major horizontal surface 148 are provided a number of cut-outs 146 of varying geometric shape and in various predetermined locations in the major surface 148 of the base 12.

Figure 11:
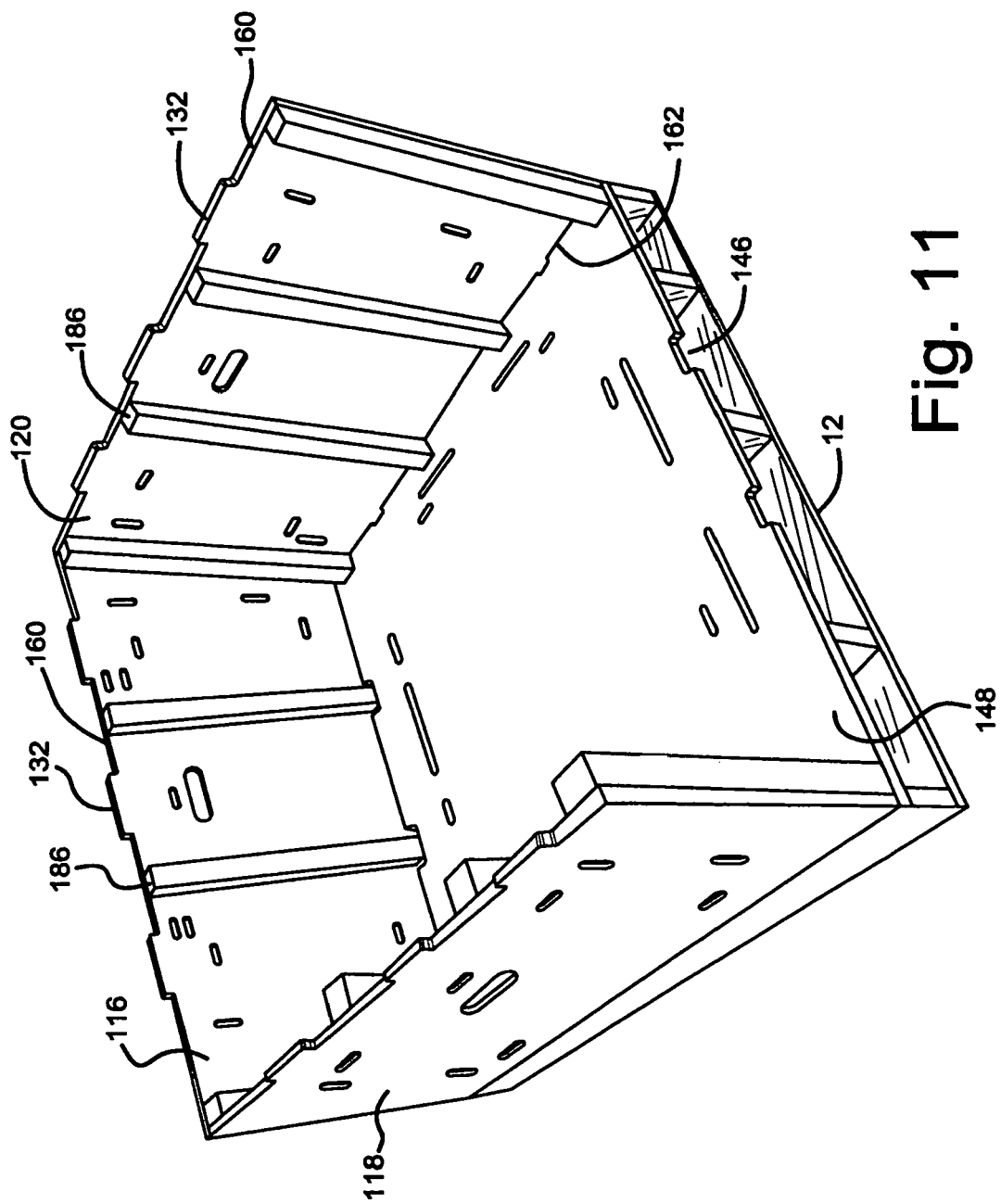
FIG. 11 shows end and side walls with vertical supports attached via tabs and slots to the base in accordance with the second embodiment.

Further, the reusable container 10 of the second embodiment has at least one front wall panel 114, one back wall panel 116, and side wall panels 118, 120, each such panel having upper 160 and lower 162 peripheral edges, and at least one tab 132 formed in each such peripheral edge 160, 162 of each panel, all such tabs 132 being capable of being received in at least one of the cut-outs 146 in the major horizontal surface 148 of the base member 12. A partially constructed container, shown in FIG. 11, shows such tabs 132 on the upper peripheral edges 160 of a back wall panel 116 and two side wall panels 118, 120, as connected via the tabs 132 of each panel being received in a cut-out 146 in the major horizontal surface 148 of the base member 12.

Figure 13:
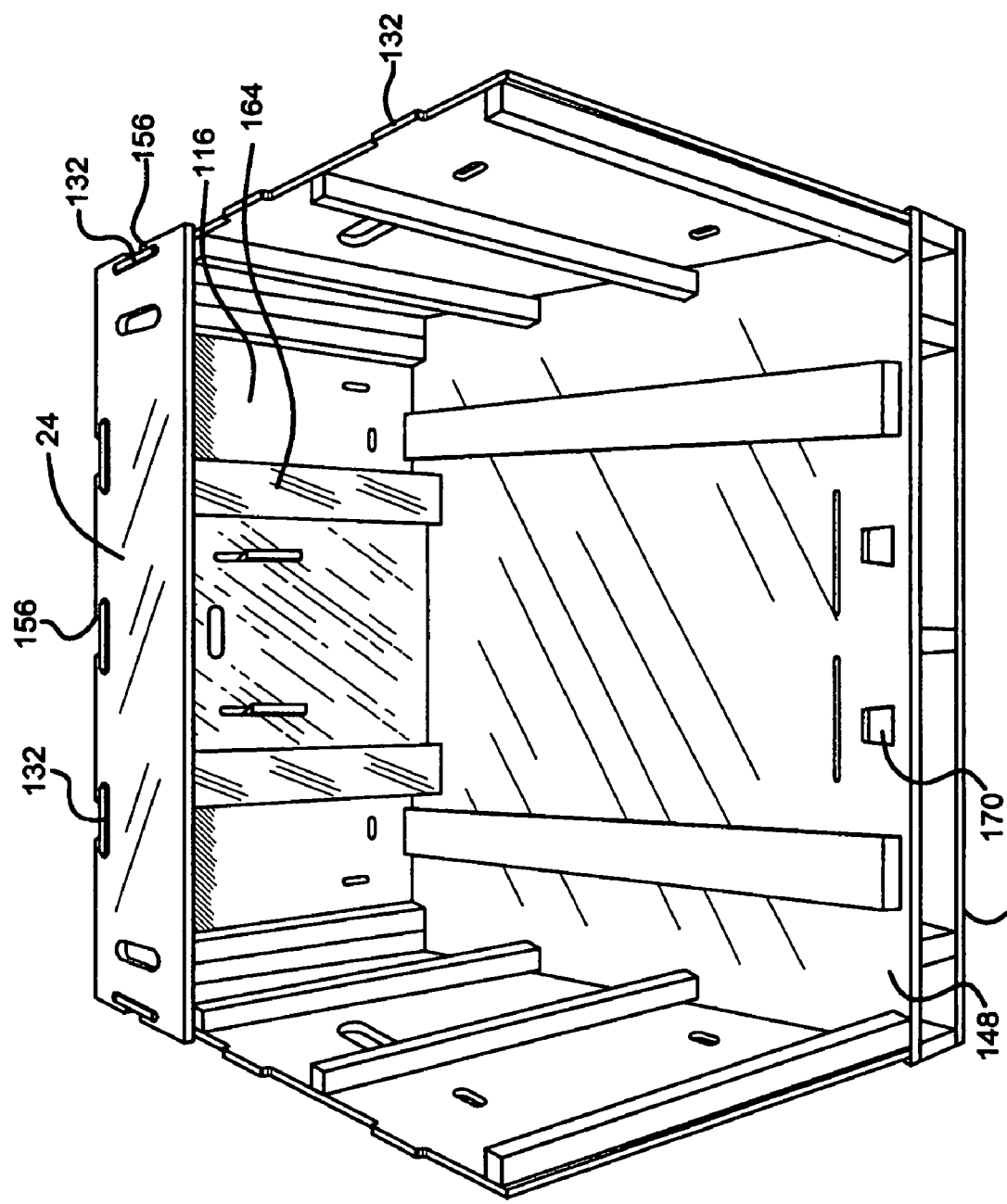
FIG. 13 is a perspective view similar to FIG. 12 with a partial lid attached to the back and side walls.

Similarly, the second embodiment of the reusable container 10 has lid panels 22, 24, which are substantially parallel to the base member 12 and substantially perpendicular to the various wall panels 114, 116, 118, 120. The lid panels 22, 24 have geometric cut-outs 146 for receiving the tabs 132 of the wall panels in interlocking engagement, as shown in FIG. 13.

Figure 12:
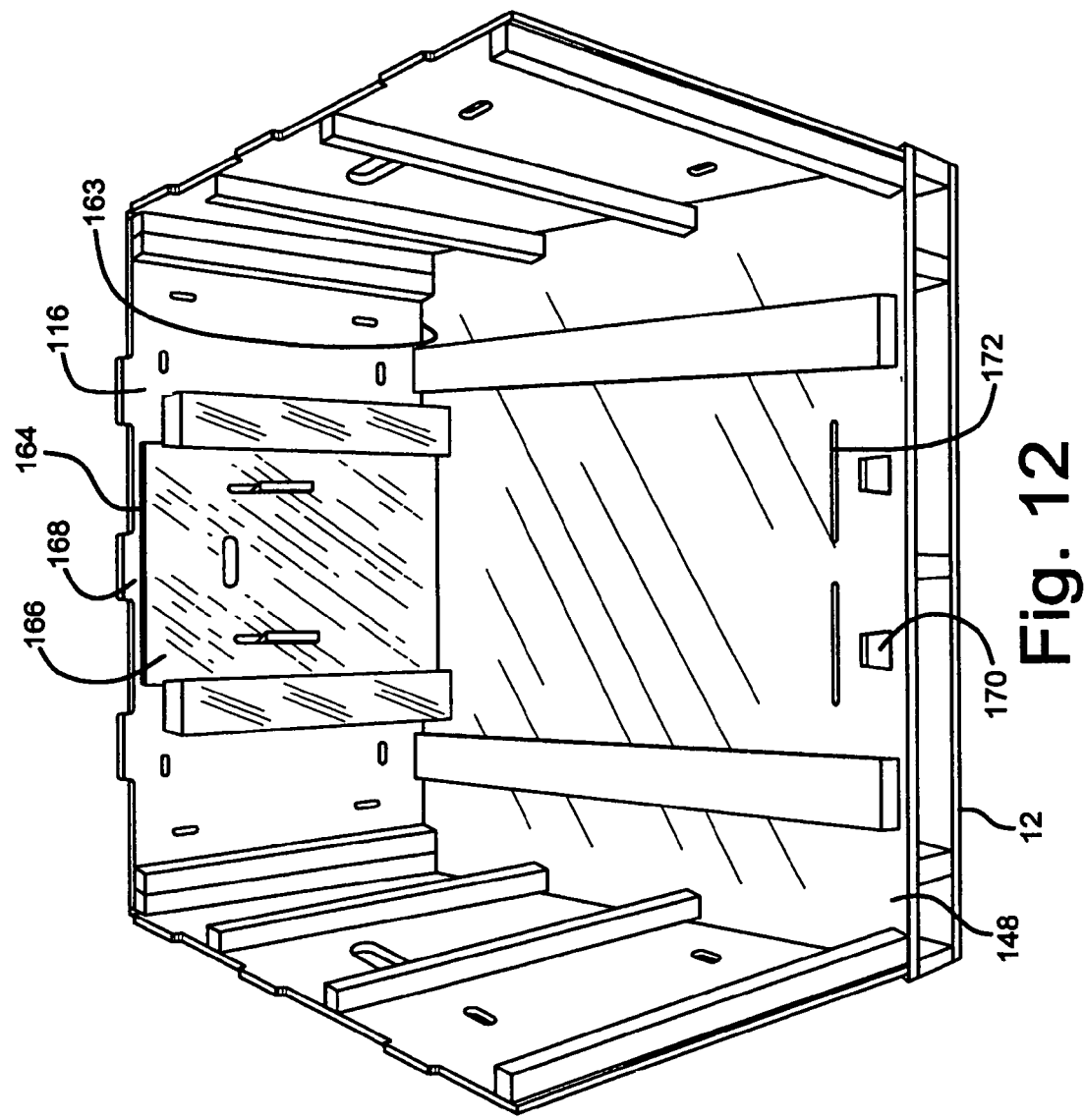
FIG. 12 is a perspective view of a base with two side walls and a back wall attached, two bottom supports in place, and a back brace assembly also attached to the base and adjacent the back wall in accordance with the second embodiment.

Additionally, the second embodiment of the reusable container of the invention utilizes a back wall brace 164, as shown in FIG. 12, to support the weight of the cargo carried in the container and to minimize undesirable movement of the cargo during transport. The back wall brace 164 has two major surfaces 166, 168, one 168 in contact with the back wall panel 116, and one 166 in contact with the product being transported in the container 10. The back wall brace 164 has tabs 134 on at least a lower peripheral edge 163 thereof, to be received in cut-outs 146 in the major horizontal surface 148 of the base member 12. Cut-outs 170, 172 for the front wall brace (not shown), are illustrative of those for back wall brace 164. The front wall brace (not shown) is substantially similar to the back wall brace 164, contacts a front wall panel 114, and the product transported in the container in a substantially similar manner, and attaches to the base member 12 in a substantially similar manner as the back wall brace 164. Both the back wall 164 and front wall braces may also have at least one complementary recess formed therein capable of receiving an upper horizontal bracing member 176, if desired.

Figure 15:
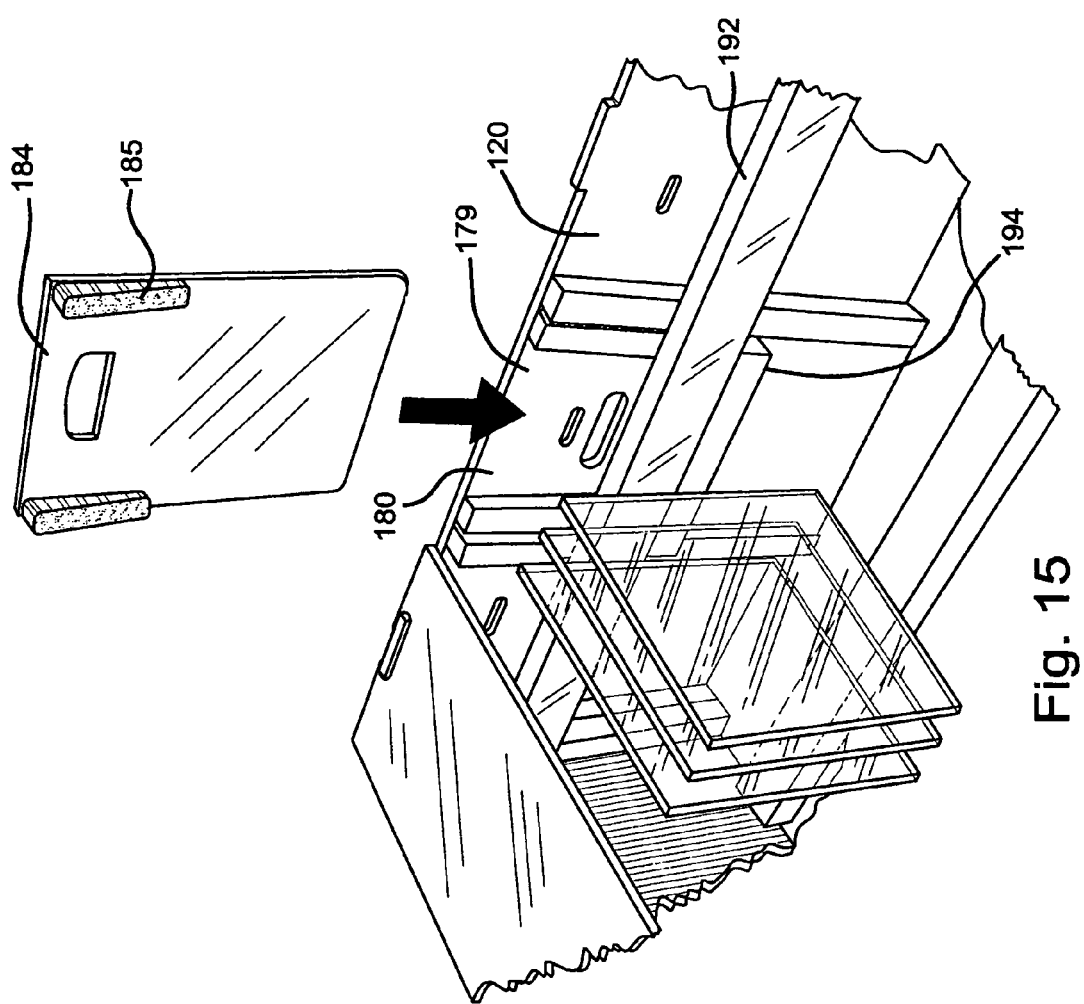
FIG. 15 is a partial perspective view of a side wall brace in relation to a container side wall and a product in contact with the side wall brace. A removable filler assembly is also shown. All are in accordance with the second embodiment of the invention.

As shown in FIG. 15, the second embodiment of the container 10 of the present invention also includes side wall brace 179 having two major surfaces 180, 182, at least a portion of one such surface 182 being in intimate contact with the at least one side wall panel 118, 120. The second major surface 180 of the side wall brace 178, 179, may be brought into supporting contact with a peripheral edge portion of the product being transported in the reusable container 10 by at least one removable filler assembly 184 which can be inserted between the major surface 182 of the at least one side wall brace 178, 179 and the at least one side wall panel 118, 120, thus moving the side wall brace 178, 179 into intimate supporting contact with the peripheral edge of the product in the reusable container 10.

Figure 7:
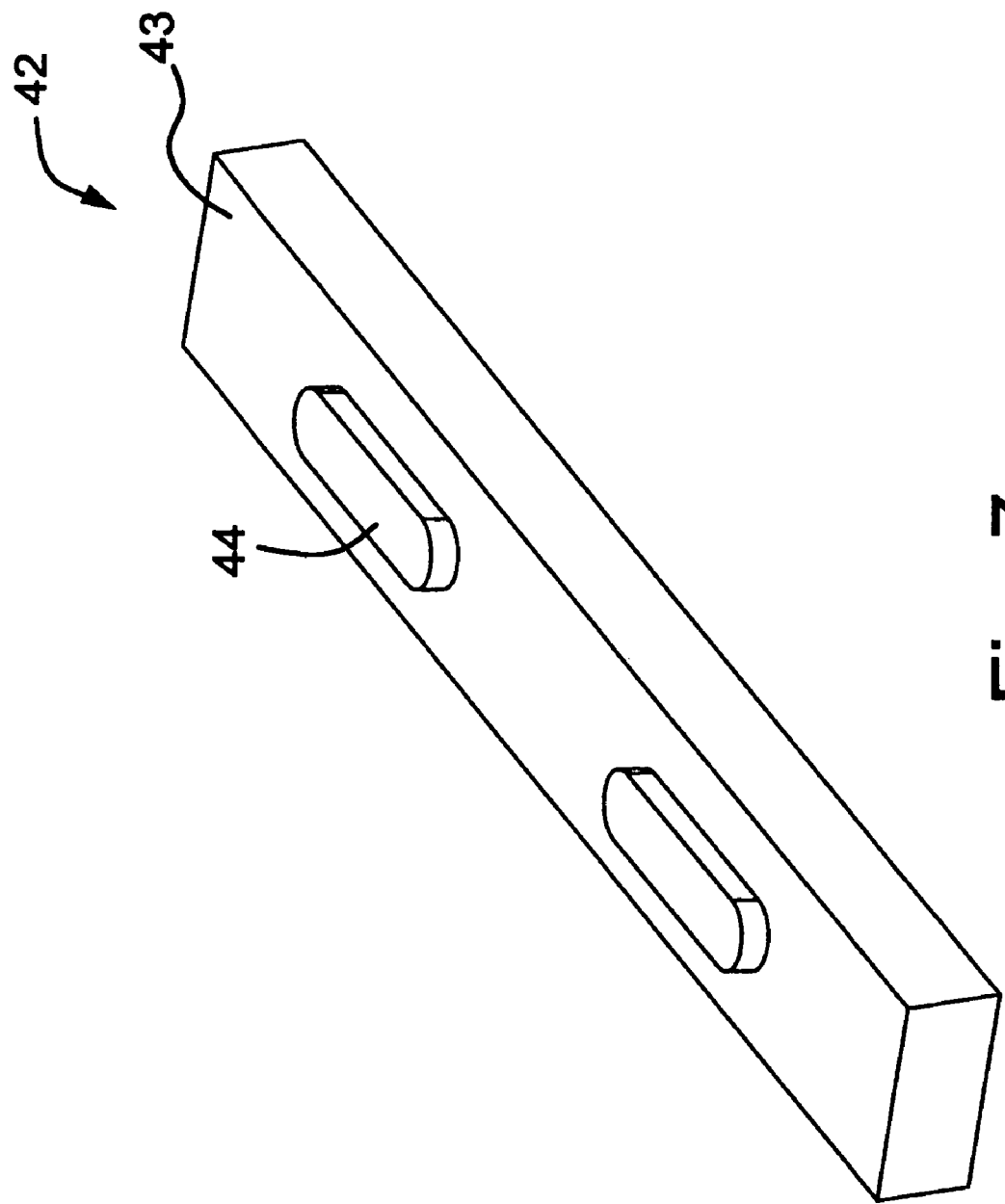
FIG. 7 is an isolated perspective view of a bottom support shown with at least one male locating device in accordance with the invention.
Figure 9:
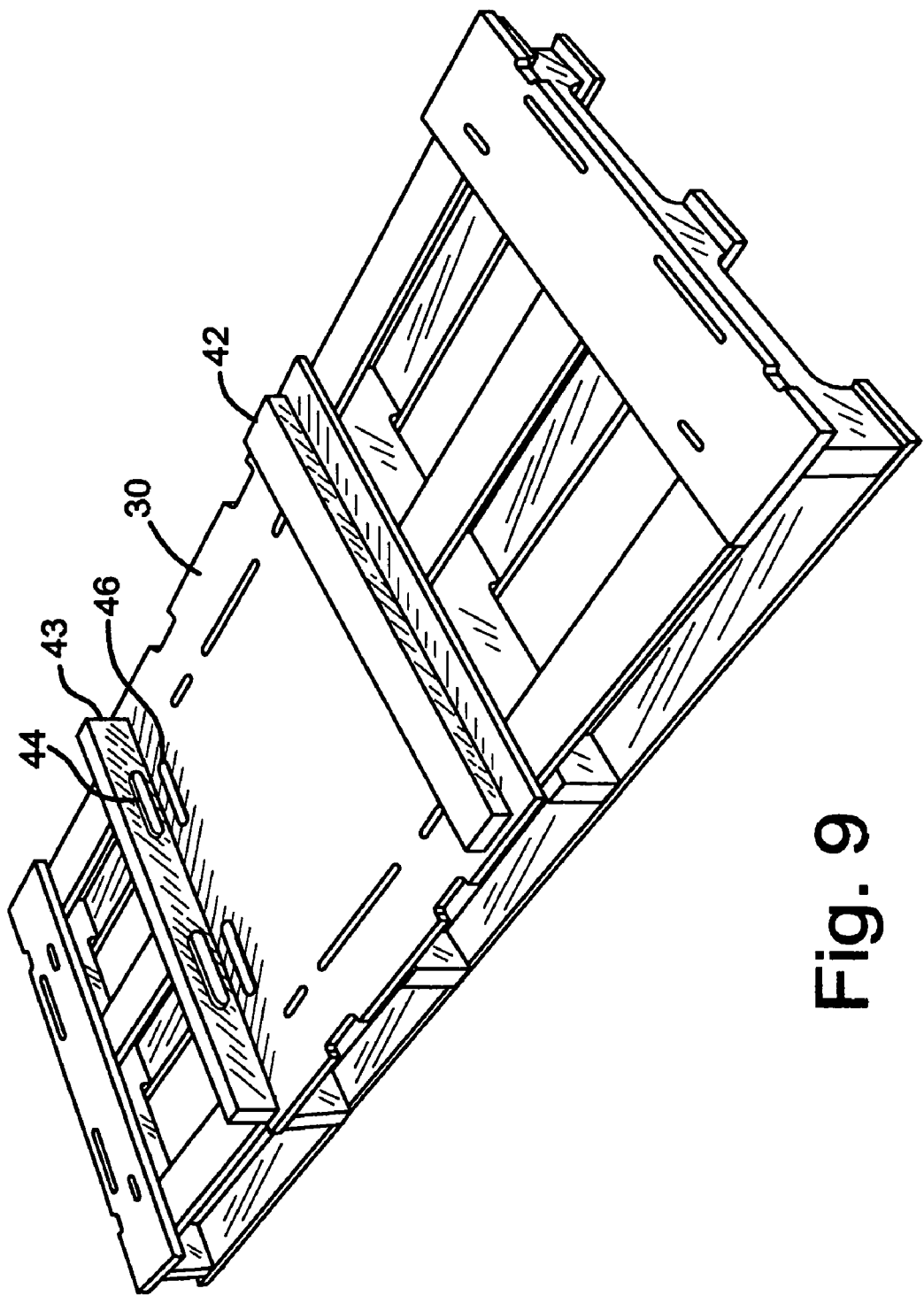
FIG. 9 shows how a pair of bottom support engage the back brace carrier in accordance with the first embodiment.

Similar to the first embodiment, the second embodiment of the reusable container 10 of the present invention may also include at least one elongate bottom-support member 42 on which the product being transported in the container is supported (see FIGS. 7-9). The bottom surface 43 of the bottom support member 42 has at least one male locating device 44 that may be received in a cut-out of complementary shape to the male locating device in the major horizontal surface 148 of the base member 12 so as to interlock the bottom support member 42 with the major horizontal surface 148 of the base member 12 of the container 10.

To provide additional strength to the structure of the container 10 of the present invention, the at least one front wall panel 114, the at least one back wall panel 116, and the at least one side wall panel 118, 120 may each have a plurality of elongate vertical support members attached thereto, as can be seen in FIGS. 11-13. The lower end of such vertical support members 186 may be received in cut-outs (similar to cut-out 172 in FIG. 12) having a complementary shape and location in the major horizontal surface 148 of the base member 12.

As previously described herein, the front and back wall braces 164, like the various wall panels 114, 116, 118, 120, have at least one tab member 132 integrally formed in the upper peripheral edges 168 of such braces. The tabs 132 may be interlockingly received in cut-outs 156 of complementary shape and location formed in the lid panels 22, 24.

Figure 14:
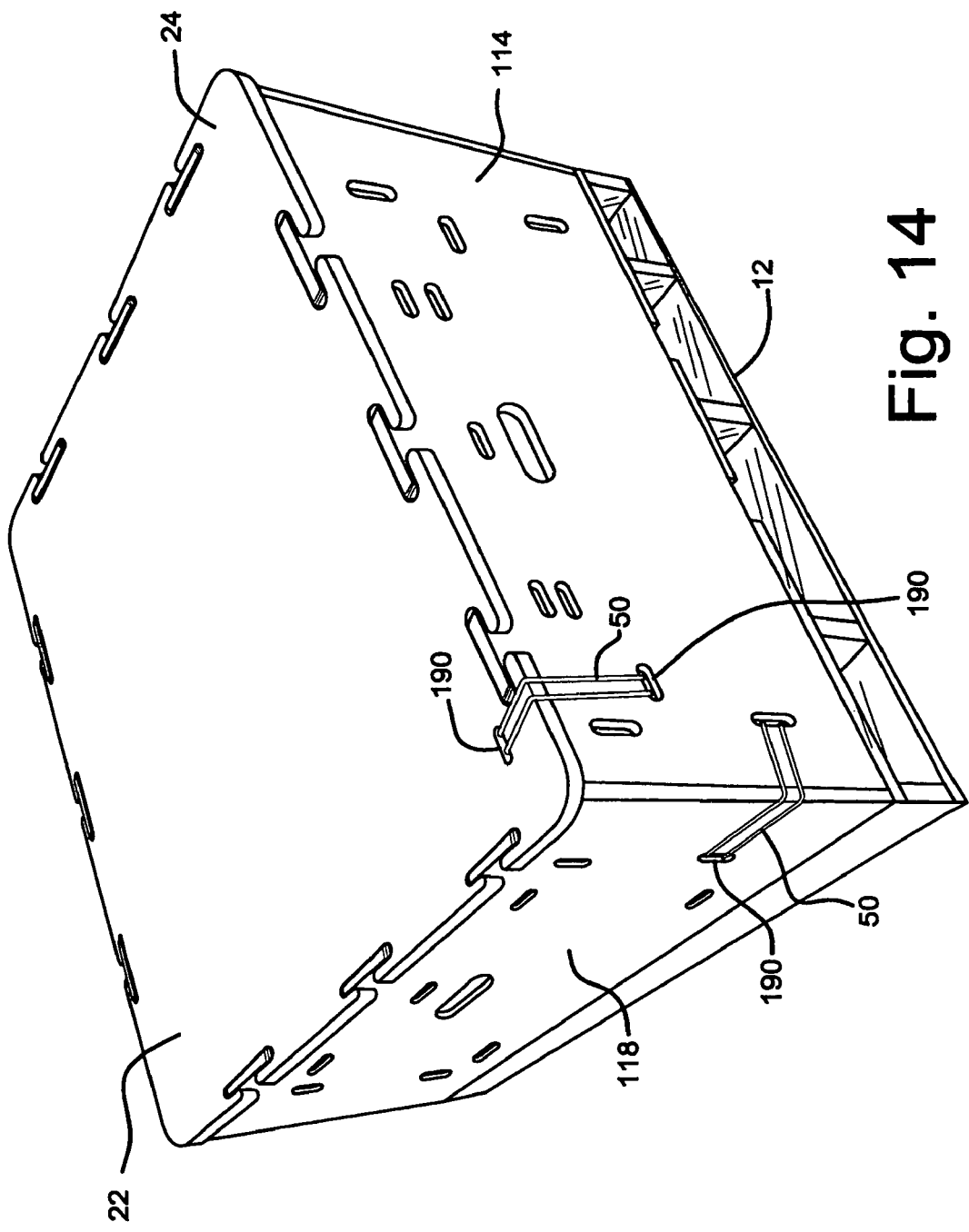
FIG. 14 is a perspective view of the assembled improved reusable container in accordance with the second embodiment.

The reusable container 10 of the present invention may also have formed, in one or more of the peripheral edges of the base member 12, a major surface of the front, back and side wall panels 114, 116, 118, 120, as well as the lid panels 22, 24, a plurality of clip slots 190. (See, for example FIG. 14). Each such clip slot 190 is capable of receiving an end of a resilient clip 50 preferably, a resilient metal clip. When each end of any given clip 50 is secured in clip slots 190 in two different components of the container of the present invention, such clips 50 assist in strengthening the connection between such components, such as lid panels 22, 24, and front, back and side wall panels 114, 116, 118, 120.

In a preferred configuration, the major horizontal surface 148 of the base 12 and the front, back and side wall panels 114, 116, 118, 120, are formed from a wood composite material such as oriented strand board (OSB). Also in a preferred configuration, the front, back and side wall panels 114, 116, 118, 120 are substantially identical.

Figure 16:
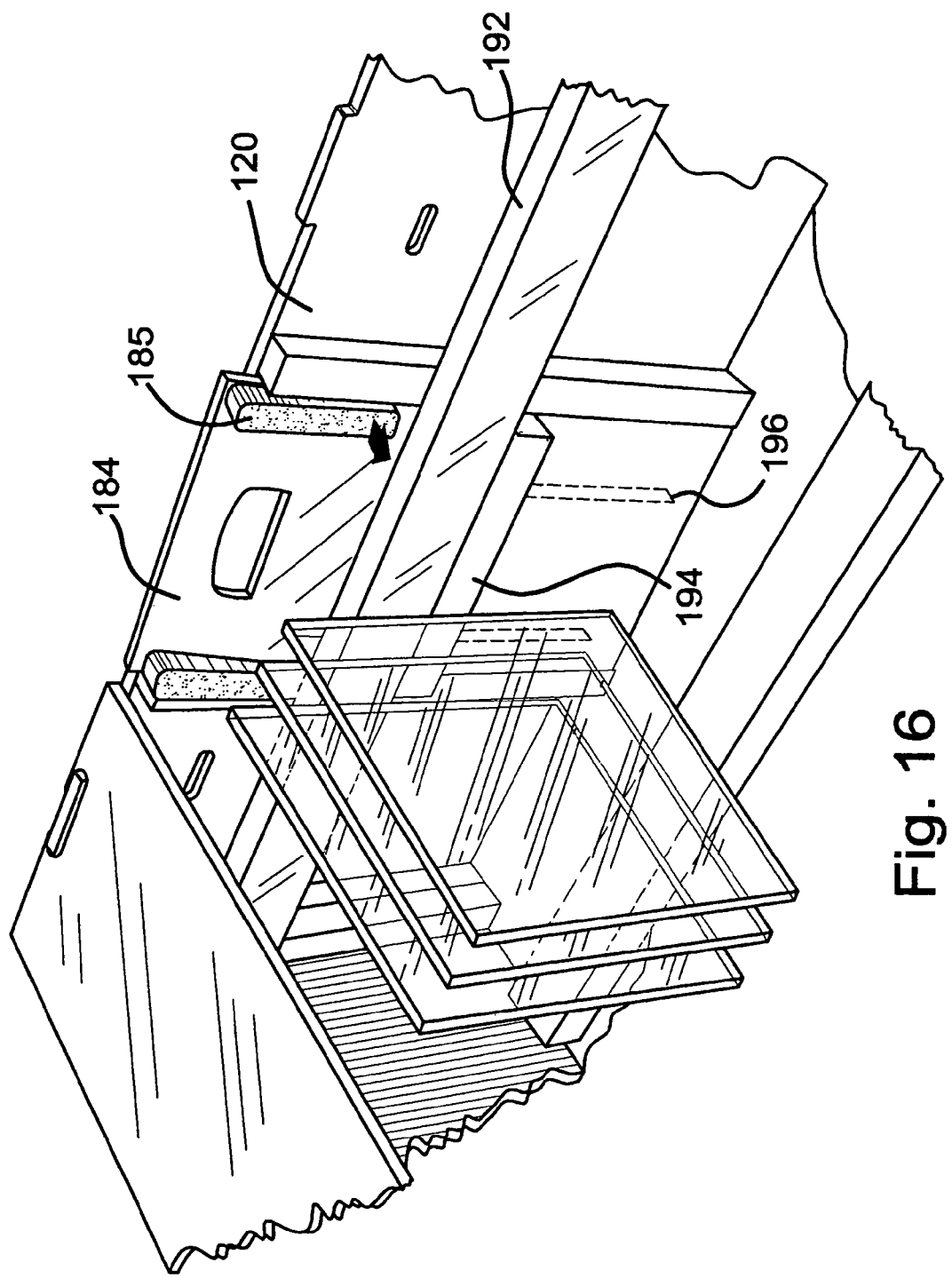
FIG. 16 is a partial perspective view similar to FIG. 15, but with the removable filler assembly positioned in the container as it would be when the filled container is in transport.

In certain situations, additional bracing inside the container may be desirable to further diminish the possibility of movement of the product being transported in the container. As such, side wall braces 178, 179 may have the additional features of a major side support member 192 with a supplemental brace locating device 194 attached thereto, the supplemental brace locating device 194 being in a substantially horizontal orientation relative to the major side support member 192. In one configuration, the major side support member 192 may have one or more vertical slots 196 cut into the major surface thereof, so as to allow the location of the supplemental brace locating device 194 to be vertically adjustable. (See FIG. 16.)

In the second embodiment of the container 10 of the present invention, the previously mentioned removable filler assembly is now described in greater detail. A resilient portion 185 of the at least one removable filler assembly 184 may be any suitable resilient polymeric material, preferably, a polymeric foam material. A protective covering typically encases the resilient material. Any suitably durable material may be used; however, a corrugated cardboard/paperboard material is preferred. The corrugated material may be coated with, for example, a plastic to further increase durability of the removable filler assembly.

One benefit of the reusable container 10 of the present invention is that it has substantial structural integrity, even when only partially assembled. As shown in FIGS. 11-12, the container 10 is largely self-supporting even without a front wall panel 114, or lid panels 22, 24. Such structural integrity allows the container 10 to be loaded by an electromechanical device, such as a robot (not shown), and then completing assembly of the container 10. This capability is highly desirable with, for example, large, heavy sheets of glass or automotive glass parts.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A reusable container for transporting a product comprising, in combination:
   a base;
   a lid, comprising at least one lid panel; and
   at least one wall having upper and lower peripheral edges, each peripheral edge having at least one locking tab integrally formed therein to cooperatively connect the base to the lid, mounted generally perpendicular to the base and to the lid;
   wherein the lid and the base each have at least one T-shaped cut-out which is for receiving at least the one locking tab of one of the peripheral edges of the at least one wall.

2. The reusable container defined in claim 1 further comprising at least one tie strap which connects a first lid panel to a second lid panel, allowing the first lid panel to be pivotably connected to the second lid panel.

3. The reusable container defined in claim 1 comprising at least two walls, both interlockingly connected to the base and to the lid, wherein the walls are separate from one another.

4. The reusable container defined in claim 1 further comprising a plurality of clips and corresponding clip slots positioned in the base, the at least one lid panel and the at least one wall, wherein the clips operatively engage the clip slots, connecting the lid wall to the at least one wall and the base to the at least one wall.

5. The reusable container defined in claim 4 wherein the clip comprises two sections at an acute angle to one another.

6. A reusable container for transporting a product comprising, in combination:
   a base having a major horizontal surface and a plurality of cut-outs of varying geometric shapes formed in the major surface of the base, the cut-outs being in various predetermined locations in the major surface of the base;
   at least one front and one back wall panel oriented substantially perpendicular to the base and having upper and lower peripheral edges, at least one tab being formed in each of the upper and lower peripheral edges, such tabs being capable of being received by at least one of the cut-outs in the base;
   at least one lid panel oriented substantially parallel to the base, and substantially perpendicular to the at least one wall member, the at least one lid panel having a plurality of cut-outs formed in the lid panel, at least one cut-out located in the lid panel so as to be capable of receiving the at least one tab of the upper peripheral edge of the at least one wall panel;
   a front wall brace and a back wall brace having two major surfaces, at least a portion of one surface thereof in intimate contact with the at least one front and one back wall panel, respectively, the second major surface of the front and back braces being capable of supporting the product transported in the reusable container;

at least one side wall panel oriented substantially perpendicular to the base and to the at least one lid panel, and having upper and lower peripheral edges, at least one tab being formed in each of the upper and lower peripheral edges, such tabs being capable of being interlockingly received by at least one of the cut-outs having complementary shapes in the base and in the at least one lid panel;

at least one side wall brace having two major surfaces, at least a portion of one surface thereof in intimate contact with the at least one side wall panel, a second surface of the at least one side wall brace being capable of supporting the product transported in the reusable container; and at least one removable filler assembly capable of being inserted between the at least one side wall brace and the at least one side wall panel so as to move the side wall brace into intimate contact with a peripheral edge portion of the product being transported in the reusable container.

7. The reusable container defined in claim 6, wherein at least one elongate bottom support member has at least one male locating device that is capable of being received in one of the cut-outs having a complementary shape in the major horizontal surface of the base, so as to allow the at least one bottom support to be in intimate contact with the major horizontal surface of the base.

8. The reusable container defined in claim 6, wherein the at least one front wall panel, the at least one back wall panel and the at least one side wall panel each have a plurality of vertical support members attached thereto, the vertical support members having a rectilinear cross section, the rectilinear shape being capable of being received into positioning contact with a plurality of cut-outs having complementary shapes in the major horizontal surface of the base.

9. The reusable container defined in claim 6, wherein the front and back wall braces have upper and lower peripheral edges in which at least one tab is formed so as to be capable of being interlockingly received in a cut-out in both the horizontal major surface of the base and in the at least one lid panel.

10. The reusable container defined in claim 6, wherein the peripheral edges of the base member, a major surface of the at least one front wall panel, the at least one back wall panel, the at least one side wall panel and the at least one lid panel each have a plurality of clip slots formed therein, each clip slot capable of lockingly receiving a portion of a clip therein, wherein the clips operatively assist in connecting the wall panels to the base and to the at least one lid panel.

11. The reusable container defined in claim 6, wherein the major horizontal surface of the base, the at least one front wall and one back wall panel, the at least one side wall panel, and the at least one lid panel comprise oriented strand board.

12. The reusable container defined in claim 10, wherein the clips are comprised of a resilient metal.

13. The reusable container defined in claim 6, wherein the at least one front wall panel, the at least one back wall panel, and the at least one side wall panel are substantially identical.

14. The reusable container defined in claim 6, wherein the at least one side wall brace comprises a plurality of vertical supports and a major side support member attached thereto, and a supplemental brace locating device attached to the major side support member in a substantially horizontal orientation.

15. The reusable container defined in claim 14, wherein the major side support member has one or more vertical slots therein to allow the supplemental brace locating device to move vertically for a prescribed distance.

16. The reusable container defined in claim 6, wherein the at least one removable filler assembly comprises a resilient polymeric material, which polymeric material is substantially encased in an outer layer of a corrugated material.

17. The reusable container defined in claim 16, wherein the resilient polymeric material is a polymeric foam.

18. The reusable container defined in claim 17, wherein the corrugated material is a plastic coated corrugated material.

19. The reusable container defined in claim 6, having a lid comprising at least two lid panels, each lid panel being substantially perpendicular to the at least one wall member, the at least two lid panels being hingedly connected to one another.

20. The reusable container defined in claim 19, wherein the hinging connection comprises one or more plastic straps.

21. The reusable container defined in claim 19, wherein the at least two lid panels, in combination, do not cover the entire horizontal surface area of the container.

22. The reusable container defined in claim 9, wherein the front and back wall braces each have at least one complementary recess capable of receiving an upper horizontal bracing member.

23. The reusable container defined in claim 1 having a back brace comprising lateral extensions to the basic rectangular configuration of such back brace.

24. The reusable container defined in claim 1 having a back brace comprising at least two interconnected horizontal and vertical support members and integral tabs extending from peripheral edges thereof, so as to be capable of interlocking with the base, at least one lid panel and at least one wall by insertion of the tabs into a complementary cut-out in the base, lid panel and wall.

25. A method of electromechanically loading a product into a reusable container utilizing the reusable container of claim 6.

\* \* \* \* \*